United States Patent
Horikawa et al.

(10) Patent No.: US 11,380,906 B2
(45) Date of Patent: Jul. 5, 2022

(54) POSITIVE ELECTRODE MATERIAL AND SECONDARY BATTERY USING THE SAME

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Ryuta Sugiura, Toyohashi (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 172 days.

(21) Appl. No.: 16/582,971

(22) Filed: Sep. 25, 2019

(65) Prior Publication Data

US 2020/0136152 A1  Apr. 30, 2020

(30) Foreign Application Priority Data

Oct. 25, 2018  (JP) .............................. JP2018-200563

(51) Int. Cl.
| | | |
|---|---|---|
| *H01M 4/36* | (2006.01) | |
| *H01M 4/90* | (2006.01) | |
| *H01M 10/0525* | (2010.01) | |
| *H01M 4/02* | (2006.01) | |
| *H01M 4/485* | (2010.01) | |
| *H01M 4/136* | (2010.01) | |

(52) U.S. Cl.
CPC ..... *H01M 4/9033* (2013.01); *H01M 10/0525* (2013.01); *H01M 4/136* (2013.01); *H01M 4/362* (2013.01); *H01M 4/364* (2013.01); *H01M 4/366* (2013.01); *H01M 4/485* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 3,896,216 | A * | 7/1975 | Fagherazzi | ............. C04B 35/26 |
| | | | | 423/598 |
| 5,783,165 | A * | 7/1998 | Wilson | ................. C01G 23/006 |
| | | | | 423/598 |

(Continued)

FOREIGN PATENT DOCUMENTS

| | | |
|---|---|---|
| JP | 2011-210694 A | 10/2011 |
| JP | 2013-155071 A | 8/2013 |

*Primary Examiner* — Jeremiah R Smith
(74) *Attorney, Agent, or Firm* — Oliff PLC

(57) ABSTRACT

According to an aspect of the present invention, there is provided a positive electrode material which contains a positive electrode active material, and a dielectric material having a perovskite crystal structure. In the positive electrode material, in an X-ray diffraction pattern (vertical axis: diffraction intensity, horizontal axis: diffraction angle 2θ (rad)) obtained by X-ray diffraction measurement using a CuKα ray, a highest intensity peak which is a peak derived from the dielectric material and has the highest intensity is in a range satisfying 2θ=31° to 32°, and a half width x of the highest intensity peak satisfies the following expression: $0.22 \leq x \leq 0.33$.

5 Claims, 2 Drawing Sheets

(56) References Cited

U.S. PATENT DOCUMENTS

| | | | | |
|---|---|---|---|---|
| 6,348,705 | B1* | 2/2002 | Hendrix | C23C 16/40 |
| | | | | 257/295 |
| 8,728,671 | B1* | 5/2014 | Brost | H01M 4/8846 |
| | | | | 429/405 |
| 2002/0048547 | A1* | 4/2002 | Lee | C01G 23/006 |
| | | | | 423/598 |
| 2004/0105214 | A1* | 6/2004 | Nakamura | H01G 4/30 |
| | | | | 361/321.2 |
| 2004/0213730 | A1* | 10/2004 | Swanson | C04B 35/4682 |
| | | | | 423/598 |
| 2012/0021298 | A1* | 1/2012 | Maeda | H01M 4/131 |
| | | | | 429/304 |
| 2012/0189536 | A1* | 7/2012 | Wang | C01B 3/40 |
| | | | | 423/654 |
| 2017/0237067 | A1* | 8/2017 | Miki | H01M 4/136 |
| | | | | 429/220 |
| 2019/0260068 | A1* | 8/2019 | Yamamoto | H01M 10/049 |

* cited by examiner

POSITIVE ELECTRODE MATERIAL AND SECONDARY BATTERY USING THE SAME

CROSS REFERENCE TO RELATED APPLICATIONS

The present application claims priority based on Japanese Patent Application No. 2018-200563 filed on Oct. 25, 2018, the entire contents of which are incorporated herein by reference in its entirety.

BACKGROUND OF THE DISCLOSURE

1. Field

The present invention relates to a positive electrode material and a secondary battery using the positive electrode material.

2. Background

For example, Japanese Patent Application Publication No. 2011-210694 discloses a positive electrode material in which a ferroelectric substance having a high relative dielectric constant (e.g., barium titanate) is sintered on a surface of a positive electrode active material, and a lithium secondary battery which uses the positive electrode material. In the lithium secondary battery disclosed in Japanese Patent Application Publication No. 2011-210694, a plane in contact with a nonaqueous electrolyte solution of the ferroelectric substance is positively charged, and an interface with the positive electrode active material is negatively charged due to a difference in potential between a positive electrode and a negative electrode. Consequently, according to Japanese Patent Application Publication No. 2011-210694, a lithium ion in the nonaqueous electrolyte solution is attracted to the positive electrode active material, and an interface reaction can smoothly progress even in a low-temperature environment. In addition, although not related in terms of the technical field, Japanese Patent Application Publication No. 2013-155071 discloses a dielectric material and a manufacturing method therefor.

SUMMARY

However, according to studies conducted by the present inventors, in the case where the technique in Japanese Patent Application Publication No. 2011-210694 is applied to a secondary battery which is mounted on a vehicle such as, e.g., an automobile and is used as a power source for driving the vehicle, there is still room for improvement. That is, in the secondary battery used as the power source for driving the vehicle, what is called high rate discharge which performs discharge with a large current in a short period of time is performed. In view of this usage, the technique in Japanese Patent Application Publication No. 2011-210694 still has room for improvement.

The present invention has been made in view of the above circumstances, and an object thereof is to provide a positive electrode material which allows production of a secondary battery excellent in high rate characteristics. Another related object thereof is to provide a secondary battery excellent in high rate characteristics.

According to an aspect of a technique disclosed herein, there is provided a positive electrode material containing a positive electrode active material, and a dielectric material disposed on a surface of the positive electrode active material and having a perovskite crystal structure. In the positive electrode material, in an X-ray diffraction pattern (vertical axis: diffraction intensity, horizontal axis: diffraction angle 2θ (rad)) which is obtained by X-ray diffraction measurement using a CuKα ray, a highest intensity peak which is a peak derived from the dielectric material and has a highest intensity is in a range satisfying 2θ=31° to 32°, and a half width x of the highest intensity peak satisfies the following expression: $0.22 \leq x \leq 0.33$.

In the positive electrode material having the highest intensity peak, when a voltage is applied, a local increase in dielectric constant is caused. With this, affinity with an electrolyte is increased. As a result, by using the positive electrode material, reaction activity of a positive electrode is enhanced, and a secondary battery excellent in high rate characteristics can be suitably implemented. That is, it is possible to reduce resistance of the positive electrode and improve high rate output characteristics. In addition, even after high rate charge and discharge are repeated, it is possible to maintain excellent output characteristics.

In a preferred aspect of the positive electrode material disclosed herein, the dielectric material is a compound which contains at least one of Sr, Ba, and La; and Ti. With this, it is possible to exert an effect of addition of the dielectric material at a higher level, and improve high rate characteristics.

In a preferred aspect of the positive electrode material disclosed herein, the dielectric material has an $ABO_{3-\delta}$ crystal structure (in which δ is an oxygen deficiency amount), and a molar ratio of an element at an A site to an element at a B site is 0.920 or more and 0.993 or less. By adjusting the molar ratio of the element at the A site to the element at the B site to a value in the above range, it is possible to further promote the local increase in dielectric constant. Consequently, it is possible to exert the effect of addition of the dielectric material at a higher level, and improve high rate characteristics.

In a preferred aspect of the positive electrode material disclosed herein, the dielectric material has an $ABO_{3-\delta}$ crystal structure (in which δ is a positive number satisfying $0.1 \leq \delta \leq 0.3$). By adjusting the oxygen deficiency amount δ to a value in the above range, polarization of the dielectric material is facilitated. With this, moving speed of a charge carrier ion is improved. Consequently, it is possible to exert the effect of addition of the dielectric material at a higher level, and improve high rate characteristics.

In a preferred aspect of the positive electrode material disclosed herein, when a content of the positive electrode active material is 100 mol %, a content of the dielectric material is 0.01 mol % or more and 10 mol % or less. With this, it is possible to stably exert the effect of addition of the dielectric material at a high level, and stably improve high rate characteristics.

In addition, according to an aspect of the technique disclosed herein, there is provided a secondary battery including the positive electrode material in a positive electrode. Such a secondary battery is excellent in high rate characteristics, e.g., at least one of high rate output characteristics and high rate cycle characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, a preferred embodiment of a technique disclosed herein will be described with reference to the drawings appropriately. Note that, apart from matters which are specifically mentioned in this specification (e.g., a composition and properties of a positive electrode material), other matters which are necessary for implementing the technique disclosed herein (e.g., other battery components or common manufacturing processes which don't characterize the technique disclosed herein) can be understood as design matters of those skilled in the art based on conventional techniques in the field. The technique disclosed herein can be implemented based on contents disclosed in the present specification and common general technical knowledge in the field. In addition, in the case where a numerical range is described as "A to B" (herein, A and B are any numerical values) in the present specification, "A to B" means "not less than A and not more than B".

Positive Electrode Material

Figure 1:
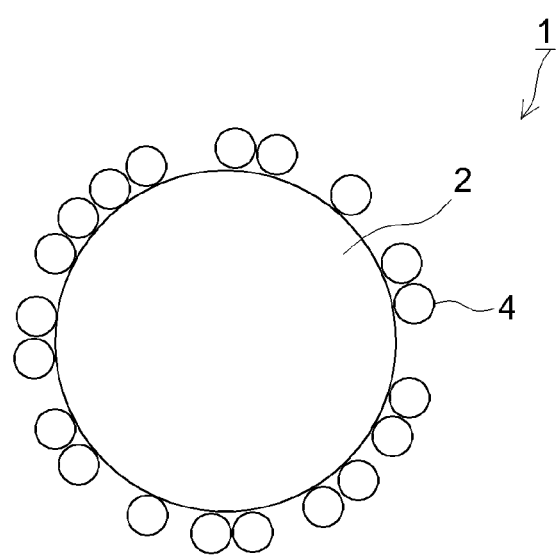
FIG. 1 is a schematic cross-sectional view of a positive electrode material according to an embodiment.

FIG. 1 is a schematic cross-sectional view of a positive electrode material 1 according to an embodiment. Hereinbelow, the technique disclosed herein will be specifically described by using the positive electrode material 1 as an example although the description is not intended to limit the technique particularly.

The positive electrode material 1 is a material which is used in a positive electrode of a secondary battery. The positive electrode material 1 is a particulate material, and contains a positive electrode active material 2, and a dielectric material 4 disposed on a surface of the positive electrode active material 2. The positive electrode material 1 is a composite particle. The positive electrode active material 2 is a portion which serves as a nucleus of the positive electrode material 1. The dielectric material 4 is adhered to the surface of the positive electrode active material 2 physically and/or chemically by, e.g., mechanochemical processing described later. The positive electrode material 1 has an interface between the positive electrode active material 2 and the dielectric material 4. In the positive electrode material 1, the positive electrode active material 2 and the dielectric material 4 are adhered to each other to be integrated with each other. With this, it is possible to exert the effect of the technique disclosed herein at a level higher than, e.g., that in the case where the positive electrode active material 2 and the dielectric material 4 are mixed as particles which are independent of each other.

The positive electrode active material 2 is a material which can reversibly occlude and release a charge carrier (e.g., lithium in a lithium secondary battery). The type of the positive electrode active material 2 is not particularly limited, and it is possible to appropriately select one or two or more positive electrode active materials from among conventionally used positive electrode active materials, and use the selected positive electrode active materials. A preferable example of the positive electrode active material 2 include a compound which contains lithium and one or two or more transition metal elements, i.e., a lithium/transition metal composite oxide.

Typical examples of the lithium/transition metal composite oxide include a lithium/transition metal composite oxide having a layer structure, a lithium/transition metal composite oxide having a spinel structure, and a lithium/transition metal phosphate having an olivine structure. The lithium/transition metal composite oxide preferably contains one or two or more of Ni, Co, and Mn as the transition metal element. Specific examples of the lithium/transition metal composite oxide include a lithium/cobalt-containing composite oxide, a lithium/manganese-containing composite oxide, a lithium/nickel-containing composite oxide, a lithium/nickel/manganese-containing composite oxide, a lithium/nickel/cobalt/manganese-containing composite oxide, and a lithium/nickel/cobalt/aluminum-containing composite oxide. Among them, the lithium/nickel/cobalt/manganese-containing composite oxide is preferable. With this, it is possible to exert the effect of the technique disclosed herein at a high level and improve, e.g., high rate output characteristics and high rate cycle characteristics.

An example of the lithium/nickel/cobalt/manganese-containing composite oxide includes a composite oxide represented by the following formula (I):

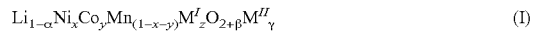

$$Li_{1-\alpha}Ni_xCo_yMn_{(1-x-y)}M^I_zO_{2+\beta}M^{II}_\gamma \qquad (I)$$

($\alpha$ satisfies $-0.1 \leq \alpha \leq 0.7$. $\beta$ is a value determined such that a charge neutrality condition is met (typically $\beta$ satisfies $-0.5 \leq \beta$, e.g., $-0.5 \leq \beta \leq 0.5$). $\gamma$ satisfies $0 \leq y \leq 0.5$. x satisfies $0.1 \leq x \leq 0.9$. y satisfies $0.1 \leq y \leq 0.4$. z satisfies $0 \leq z \leq 0.1$. The composite oxide may or may not contain $M^I$ and/or $M^{II}$. When $0 < z$ is satisfied, $M^I$ is one or two or more of Zr, Mo, W, Mg, Ca, Na, Fe, Cr, Zn, Si, Sn, and Al. When $0 < \gamma$ is satisfied, $M^{II}$ is one or two or more halogens (e.g., F, Cl, and Br)).

In the formula (I), $\alpha$ may satisfy $-0.1 \leq \alpha \leq 0.2$. x may satisfy $0.1 \leq x \leq 0.4$. Among the composite oxides represented by the formula (I), the composite oxide in which x, y, and (1−x−y) are substantially equal to each other (e.g., a difference therebetween is 0.1 or less) has a high energy density, and is excellent in thermal stability. Accordingly, it is possible to exert the effect of the technique disclosed herein at a higher level.

Although not particularly limited, an average particle diameter of the positive electrode active material 2 is preferably about 1 μm or more, and, e.g., 5 μm or more in consideration of workability and handling ease when the dielectric material 4 is adhered to the surface thereof. In addition, from the viewpoint of forming the positive electrode densely and uniformly, the average particle diameter is preferably about 30 μm or less, typically 20 μm or less, and, e.g., 10 μm or less. Note that the "average particle diameter" in the present specification denotes the particle diameter corresponding to cumulative 50% from the smaller-diameter side in a particle size distribution of an equivalent circle diameter (based on the number) based on electron microscope observation.

The dielectric material 4 is interposed between the positive electrode active material 2 and an electrolyte. The dielectric material 4 is a material which exhibits affinity with the electrolyte higher than that of the positive electrode active material 2 when a voltage is applied. In the dielectric material 4, the degree of disorder of crystallinity is adjusted so as to fall within a predetermined range. That is, in the dielectric material 4, a highest intensity peak (typically a peak top) based on X-ray diffraction (XRD) measurement which uses a CuKα ray is in a range satisfying $2\theta = 31°$ to $32°$. A half width x of the highest intensity peak satisfies $0.22 \leq x \leq 0.33$. Note that the highest intensity peak is a peak having the highest intensity in an X-ray diffraction pattern in which the vertical axis indicates an intensity and the horizontal axis indicates a diffraction angle 2θ (rad). The unit of the half width x is also rad similarly to the diffraction angle 2θ.

In general, as the degree of the disorder of the crystallinity increases, the value of the half width x of the highest intensity peak increases. By adjusting the half width x of the highest intensity peak to a predetermined value or more, i.e., by causing the disorder having a predetermined degree or higher in the crystallinity, a distortion occurs in a crystal lattice of the dielectric material 4. When a voltage is applied to the dielectric material 4, a local increase in dielectric constant is spontaneously caused so that the distortion is stabilized. With this, a force for attracting a charge carrier ion in the electrolyte is increased. Consequently, it is possible to increase affinity between the positive electrode material and the electrolyte. Note that, from the viewpoint of exerting the action more appropriately, the half width x may satisfy, e.g., 0.24≤x, and further satisfy 0.26≤x. In addition, by adjusting the half width x of the highest intensity peak to a predetermined value or less, the distortion of the crystal lattice is appropriately reduced. With this, it is possible to stably cause the increase in dielectric constant. From this, the half width x may satisfy, e.g., x≤0.32, and further satisfy x≤0.3.

With the above action, the dielectric material 4 can exert, e.g., at least one of the following functions during charge and discharge of a battery: (1) a function of attracting the charge carrier ion in the electrolyte by using dielectric polarization and assisting occlusion and release of the charge carrier in the positive electrode active material; (2) a function of reducing solvation energy of the charge carrier ion attracted to a portion of the dielectric polarization of the dielectric material 4 to promote desolvation of the charge carrier ion; and (3) a function of using a lattice defect and improving moving speed of the charge carrier ion having entered through the lattice defect. Consequently, by adjusting the half width x of the highest intensity peak of the dielectric material 4 to a value in the above range, it is possible to enhance reaction activity of the positive electrode active material 2 relatively as compared with, e.g., the case where the dielectric material which does not satisfy the range of 2θ and/or the range of the half width x is used, or the case where only the positive electrode active material 2 is used as the positive electrode material. As a result, it is possible to reduce resistance of the positive electrode at the time of, e.g., discharge, and suitably implement the secondary battery excellent in output characteristics. In addition, unevenness in charge-discharge reaction in the positive electrode becomes less likely to occur. As a result, for example, side reaction in the positive electrode is reduced, and it is possible to suitably implement the secondary battery excellent in high rate cycle characteristics.

In the technique disclosed herein, the dielectric material 4 has a perovskite crystal structure containing oxygen. Note that, in the present specification, the "perovskite crystal structure" is a term which includes, e.g., $A_2B_2O_5$, $A_2B_2O_7$, $A_2(BB'_2)O8$, $(AA'_3)B_4O_{12}$, and $(AA'_3)(BB'_3)O_{12}$ crystal structures in addition to an $ABO_3$ crystal structure. That is, the dielectric material 4 includes, e.g., an A-site ordered perovskite oxide, and what is called a perovskite-related oxide in addition to a pure perovskite oxide. Note that the crystal structure of the dielectric material 4 can be determined by using the XRD measurement which uses the CuKα ray.

In the perovskite crystal structure, elements at an A site and an A' site (hereinafter sometimes referred to as an "A element" collectively) are typically metallic elements. Although not particularly limited, specific examples of the A element include alkali metal elements (Group 1 elements) such as Na, K, Rb, and Cs; alkaline earth metal elements (Group 2 elements) such as Ca, Sr, and Ba; rare earth metal elements such as La, Ce, Nd, Sm, Gd, and Yb; Cu; Pb; and Bi. From the viewpoint of exerting the effect of the technique disclosed herein at a high level, the A element preferably includes one or two or more alkaline earth metal elements. The A element is preferably, e.g., one or two or more of the alkaline earth metal elements and the rare earth elements. The A element may be, e.g., one or two or more of Sr, Ba, and La.

In the perovskite crystal structure, elements at a B site and a B' site (hereinafter sometimes referred to as a "B element" collectively) are typically metallic elements. Although not particularly limited, specific examples of the B element include elements belonging to Groups 3 to 11 in IUPAC classification which are, e.g., Group 4 elements such as Ti, Zr, and Hf; Group 5 elements such as V, Nb, and Ta; Group 6 elements such as Cr, Mo, and W; Group 7 elements such as Mn and Tc; Group 8 elements such as Fe, Ru, and Os; Group 9 elements such as Co, Rh, and Ir; Group 10 elements such as Ni, Pd, and Pt; Group 11 elements such as Cu, Ag, and Au; rare earth metal elements such as La, Ce, and Sm; and Sn. From the viewpoint of exerting the effect of the technique disclosed herein at a high level, the B element is preferably one or two or more of Group 4 elements and Group 5 elements. The B element may be, e.g., Ti. The B element preferably includes an element different from the A element, and it is more preferable that the B element is constituted by an element different from the A element.

Specific examples of the dielectric material 4 include a barium/titanium-containing composite oxide which contains Ba at the A site and contains Ti at the B site; a strontium/titanium-containing composite oxide which contains Sr at the A site and contains Ti at the B site; a calcium/copper/titanium-containing composite oxide which contains Ca and Cu at the A site and contains Ti at the B site; a barium/lanthanum/titanium-containing composite oxide which contains Ba and La at the A site and contains Ti at the B site; a barium/manganese/titanium-containing composite oxide which contains Ba at the A site and contains Mn and Ti at the B site; a barium/cobalt/titanium-containing composite oxide which contains Ba at the A site and contains Co and Ti at the B site; and a lead/titanium-containing composite oxide which contains Pb at the A site and contains Ti at the B site. An example of the dielectric material 4 includes a composite oxide having a crystal structure represented by the following formula: $ATiO_{3-\delta}$ (wherein A is at least one of the A elements, and δ an oxygen deficiency amount).

In the perovskite crystal structure, a molar ratio between the A element and the B element may be a stoichiometric ratio or a non-stoichiometric ratio. In other words, the dielectric material 4 may be a non-stoichiometric oxide. Although not particularly limited, in the case where the dielectric material 4 is the non-stoichiometric oxide, in the perovskite crystal structure, a molar ratio c of the A element to the B element (A element/B element) is typically a positive number less than or equal to 1, and may satisfy, e.g., 0.9≤c<1, and further satisfy 0.91<c<0.995. Note that the molar ratio c can be determined by, e.g., inductively coupled plasma-mass spectrometry (ICP-MS).

In the embodiment, the molar ratio c (A element/B element) preferably satisfies, e.g., 0.920≤c≤0.993, and further preferably satisfies $0.92 \leq c \leq 0.96$. By satisfying the above ranges, it is possible to exert the function of (2) at a high level. For example, the molar ratio c satisfies the above ranges, whereby a partial lattice distortion occurs in the crystal structure of the dielectric material 4, and a local increase in dielectric constant becomes more likely to be caused so that the lattice distortion is stabilized. Consequently, variations (width) in the magnitude of a negative charge ($\delta-$) caused by the dielectric polarization become more likely to occur on the surface of the dielectric material 4. As a result, the solvation structure of the charge carrier ion attracted to the dielectric material 4 becomes unstable, and the desolvation of the charge carrier ion is promoted. That is, resistance at the time of the desolvation is reduced. Accordingly, it is possible to improve high rate output characteristics. Further, even after high rate charge and discharge are repeated, it is possible to maintain excellent output characteristics.

As an example, in the case where the dielectric material 4 has a crystal structure represented by the following formula (II): $A_aB_bO_{3-\delta}$ (wherein A is at least one of the A elements, B is at least one of the B elements, and $\delta$ is the oxygen deficiency amount), the molar ratio (a/b) between the A element and the B element is typically a positive number less than or equal to 1, and may satisfy, e.g., $0.9 \leq (a/b) \leq 1$, and further satisfy $0.91 < (a/b) < 0.995$. As described above, from the viewpoint of exerting the effect of the technique disclosed herein at a high level, the molar ratio (a/b) preferably satisfies $0.920 \leq (a/b) \leq 0.993$, and further preferably satisfies $0.92 \leq (a/b) \leq 0.96$. Although not particularly limited, the value of a may satisfy approximately $0.5 \leq a \leq 1.5$, and, e.g., $0.8 \leq a \leq 1.2$. In addition, although not particularly limited, the value of b may satisfy approximately $0.5 \leq b \leq 1.5$, and, e.g., $0.8 \leq b \leq 1.2$.

In the embodiment, the perovskite crystal structure has oxygen deficiency. In other words, the dielectric material 4 can be an oxygen-deficient perovskite oxide. The oxygen-deficient perovskite oxide can exert the function of (3) at a high level. That is, when the charge carrier ion in the electrolyte enters the internal portion of the oxygen-deficient perovskite oxide from the portion of the oxygen deficiency, the moving speed of the charge carrier ion is increased. As a result, ion conductivity of the dielectric material 4 is increased, and supply speed of the charge carrier ion to the positive electrode active material 2 is accelerated. Accordingly, it is possible to improve high rate output characteristics. Further, even after high rate charge and discharge are repeated, it is possible to maintain excellent output characteristics.

As an example, in the case where the dielectric material 4 has the crystal structure represented by the above formula (II), the oxygen deficiency amount $\delta$ is typically a positive number less than or equal to 1, and may satisfy, e.g., $0 \leq \delta < 1$, and further satisfy $0.05 < \delta < 0.4$. From the viewpoint of exerting the effect of the technique disclosed herein at a high level, the oxygen deficiency amount $\delta$ preferably satisfies approximately $0.1 < \delta \leq 0.3$, and further preferably satisfies $0.15 \leq \delta \leq 0.25$. Note that the oxygen deficiency amount $\delta$ can be determined by non-Rutherford elastic resonance scattering (NRERS) or laser Raman spectroscopy.

Although not particularly limited, the relative dielectric constant of the dielectric material 4 is preferably 10 to 500. By adjusting the relative dielectric constant to a predetermined value or more, it is possible to exert the function of (2) at a high level. From the viewpoint of exerting the function more appropriately, the dielectric constant may be preferably about 50 or more, e.g., 100 or more, and further preferably 200 or more. By adjusting the relative dielectric constant to a predetermined value or less, it is possible to exert the function of (3) at a high level. From the viewpoint of exerting the function more appropriately, the dielectric constant may be preferably about 400 or less, and, e.g., 300 or less.

In the present embodiment, the dielectric material 4 is a particulate material. Although not particularly limited, from the viewpoint of efficiently adhering the dielectric material 4 to the surface of the positive electrode active material 2, the average particle diameter of the dielectric material 4 is usually less than the average particle diameter of the positive electrode active material 2, and is preferably about 1 μm or less (1000 nm or less), typically 10 to 500 nm, and, e.g., 50 to 200 nm. By adjusting the average particle diameter to a predetermined value or less, a contact area with the positive electrode active material 2 is increased, and the effect of the technique disclosed herein is exerted more appropriately. The average particle diameter of the dielectric material 4 is preferably about 1/100 to 1/2 of the average particle diameter of the positive electrode active material 2, typically 1/50 to 1/5 thereof, and, e.g., 1/20 to 1/10 thereof. By satisfying the above ranges, it is possible to improve output characteristics and high rate cycle characteristics.

The dielectric material 4 may be adhered to the positive electrode active material 2 so as to cover the entire surface of the positive electrode active material 2, and may also be adhered thereto so as to cover only part of the surface of the positive electrode active material 2, as in the present embodiment. In other words, the positive electrode active material 2 may be partially exposed on the surface of the positive electrode material 1. The dielectric material 4 may be adhered to the positive electrode active material 2 so as to cover about more than half of the entire surface area of the positive electrode active material 2, typically 80 area percent or more thereof, and, e.g., 90 area percent or more thereof. The dielectric material 4 may be disposed in a pattern of dots (islands) on the surface of the positive electrode active material 2.

Although not particularly limited, when the content of the positive electrode active material 2 is 100 mol %, the content of the dielectric material 4 is about 0.001 to 50 mol %, typically 0.005 to 11 mol %, preferably 0.01 to 10 mol %, e.g., 0.1 to 5 mol %, and more preferably 1 to 3 mol %. By satisfying the above ranges, it is possible to exert the effect of addition of the dielectric material 4 at a high level, and improve output characteristics. Further, even after high rate charge and discharge are repeated, it is possible to maintain excellent output characteristics.

Note that the dielectric material 4 having properties described above can be produced by, e.g., dry blending (solid phase method) or wet blending (liquid phase method). For example, in the wet blending, the dielectric material 4 can be produced by mixing an A-site element source (e.g., an A element-containing alkoxide) and a B-site element source (e.g., a B element-containing alkoxide) in a reaction solvent such that the molar ratio of the A element to the B element falls within the above ranges, and sintering them. The disorder of the crystallinity of the dielectric material (i.e., the half width x of the highest intensity peak) can be adjusted by a milling process which uses a conventional known milling apparatus such as, e.g., a ball mill, a bead mill, a mixer, a disperser, or a kneader. Usually, as time of the milling process is increased, the crystallinity of the dielectric material is changed, and the degree of the disorder of the crystallinity is increased. In an example, it is preferable that the dielectric material serving as a raw material is charged into a planetary ball mill (the model "Premium line P-7" manufactured by Fritsch Japan Co., Ltd), and is subjected to the milling process for 10 to 30 minutes at a rotation speed of 1000 to 2000 rpm. The oxygen deficiency amount δ in the crystal structure of the dielectric material can be adjusted by heat treatment. Usually, as the temperature in the heat treatment is increased, the amount of oxygen of the dielectric material is reduced, and the size of a void (the oxygen deficiency amount δ) is increased. In an example, it is preferable that, in a reducing atmosphere, the dielectric material serving as the raw material is subjected to the heat treatment at a temperature of about 200° C. to 500° C., e.g., 300° C. to 400° C.

Although not particularly limited, the average particle diameter (secondary particle diameter) of the positive electrode material 1 is preferably about 0.1 μm or more, typically 1 μm or more, and, e.g., 5 μm or more in consideration of handling ease and workability when the positive electrode is produced. In addition, from the viewpoint of forming the positive electrode densely and uniformly, the average particle diameter of the positive electrode material 1 is preferably about 30 μm or less, typically 20 μm or less, and, e.g., 10 μm or less.

In the embodiment, the positive electrode material 1 has peculiar temperature dependence. That is, for example, while resistance is suppressed to a low level in a temperature range of up to a predetermined first temperature, the resistance is sharply increased when the first temperature is exceeded. With this, in the positive electrode material 1, when the temperature of the positive electrode material 1 is increased due to, e.g., overcharge or an internal short circuit, it is possible to quickly interrupt the flow of current to suppress an increase in battery temperature. In other words, the positive electrode material 1 can function as what is called a positive temperature coefficient (PTC) device having a positive temperature resistance coefficient. The first temperature is a temperature which may not be reached during normal use of the battery, and the first temperature is specifically 80° C. to 100° C., e.g., 90° C. to 100° C. The first temperature can be adjusted according to the type of the dielectric material 4 and X-ray characteristics thereof (e.g., the position of 2θ of the highest intensity peak and the half width of the highest intensity peak).

Note that the positive electrode material 1 can be manufactured by, e.g., a manufacturing method which includes the step of adhering the dielectric material 4 to the surface of the positive electrode active material 2. As the method for adhering the dielectric material 4 to the surface of the positive electrode active material 2, it is possible to appropriately use, e.g., dry blending (solid phase method), wet blending (liquid phase method), a sputtering method, a pulsed laser deposition (PLD) method, and a chemical vapor deposition (CVD) method. For example, in the case where the dry blending is used, it is preferable that the positive electrode active material 2 and the dielectric material 4 are mixed so as to have the above contents, and the mixture is subjected to the mechanochemical processing. With this, it is possible to manufacture the positive electrode material 1 in which the dielectric material 4 is combined with the surface of the positive electrode active material 2.

Positive Electrode for Secondary Battery

The positive electrode material 1 can be suitably used in the positive electrode of the secondary battery. The positive electrode of the secondary battery typically has a positive electrode current collector, and a positive electrode active material layer fixed onto the positive electrode current collector. An example of the positive electrode current collector includes a metal foil made of, e.g., aluminum or the like. The positive electrode active material layer contains at least the positive electrode material 1. In addition to the positive electrode material 1, the positive electrode active material layer may contain any component such as a conductive material, a binder, or a disperser. Examples of the conductive material include carbon black, and typically carbon materials such as acetylene black and Ketjen black. Examples of the binder include a halogenated vinyl resin such as polyvinylidene fluoride (PVdF), and a polyalkylene oxide such as a polyethylene oxide (PEO).

Secondary Battery

The positive electrode can be suitably used in construction of the secondary battery. Note that, in the present specification, the "secondary battery" is a term which includes all storage batteries which can be used repeatedly (secondary batteries), and all storage elements. The secondary battery may be, e.g., a lithium secondary battery, a nickel metal hydride battery, a lithium ion capacitor, or an electric double layer capacitor. As an example, the lithium secondary battery typically includes the positive electrode, a negative electrode, and an electrolyte.

The negative electrode may be a conventional negative electrode, and is not particularly limited. The negative electrode typically has a negative electrode current collector, and a negative electrode active material layer fixed onto the negative electrode current collector. An example of the negative electrode current collector includes a metal foil made of, e.g., copper or the like. The negative electrode active material layer contains at least a negative electrode active material. The negative electrode active material is a material which can reversibly occlude and release the charge carrier (typically the charge carrier ion). A preferable example of the negative electrode active material includes a carbon material such as graphite or the like. In addition to the negative electrode active material, the negative electrode active material layer may contain any component such as a binder or a thickener. Examples of the binder include rubber such as a styrene-butadiene rubber (SBR) or the like, and a halogenated vinyl resin such as polyvinylidene fluoride (PVdF) or the like. An example of the thickener includes cellulose such as carboxymethyl cellulose (CMC) or the like.

The electrolyte may be a conventional electrolyte, and is not particularly limited. The electrolyte may be liquid, in a sol state, or solid at a room temperature (25° C.). The electrolyte may be a liquid electrolyte solution at a room temperature (25° C.). The electrolyte typically contains a supporting electrolyte and a solvent. The electrolyte is, e.g., a nonaqueous electrolyte solution containing the supporting electrolyte and a nonaqueous solvent. The supporting electrolyte is dissociated in the solvent to generate the charge carrier ion. For example, a lithium ion is generated in the lithium secondary battery. The charge carrier ion is typically a cation such as a lithium ion, a calcium ion, or a magnesium ion, but may also be an anion such as, e.g., a fluoride ion. A specific example of the supporting electrolyte includes a fluorine-containing lithium salt such as $LiPF_6$ or $LiBF_4$. Examples of the solvent typically include nonaqueous solvents, e.g., aprotic solvents such as carbonates, ethers, esters, nitriles, sulfones, and lactones. In addition to the supporting electrolyte and the solvent, the electrolyte may contain any added component such as, e.g., a film-forming agent such as lithium bis(oxalato)borate (LiBOB) or vinylene carbonate (VC), or a gas-generating agent such as biphenyl (BP) or cyclohexylbenzene (CHB).

In the thus configured secondary battery, when a voltage is applied, affinity between the positive electrode material and the electrolyte is increased in the positive electrode. With this, the resistance of the positive electrode is reduced, and it is possible to display excellent high rate output characteristics. In addition, even after high rate charge and discharge are repeated, it is possible to maintain excellent output characteristics. Further, preferably, while electrical resistance can be suppressed to a low level in a normal use temperature range of the secondary battery, the resistance of the positive electrode is sharply increased when the normal use temperature range of the secondary battery is exceeded. With this, when the voltage of the secondary battery exceeds a predetermined voltage and overcharge is caused or a conductive foreign object sticks in the secondary battery and an internal short circuit is caused, and the internal temperature of the battery is thereby increased, it is possible to quickly interrupt the flow of current to suppress an increase in battery temperature.

Purpose of Secondary Battery

The secondary battery which includes the positive electrode material 1 in the positive electrode can be used for various purposes, and has high rate characteristics superior to conventional secondary batteries. For example, the secondary battery has high-level high rate output characteristics and high-level high rate cycle characteristics. Consequently, the secondary battery disclosed herein can be suitably used for purposes which require a high output density by utilizing the above features. Specifically, for example, the secondary battery can be suitably used as a power source for a motor mounted on a vehicle (driving power source). Although the type of the vehicle is not particularly limited, examples of the vehicle include vehicles such as a plug-in hybrid vehicle (PHV), a hybrid vehicle (HV), and an electric vehicle (EV). Note that the secondary battery may be used in a form of a battery pack in which a plurality of the secondary batteries are connected in series and/or in parallel.

Hereinbelow, several examples related to the technique disclosed herein will be described. However, it is not intended to limit the technique disclosed herein to such examples.

TEST EXAMPLE I

Study on Half Width x of Highest Intensity Peak

Preparation of Positive Electrode Material

EXAMPLE 1

First, as the positive electrode active material, a particulate lithium/nickel/cobalt/manganese composite oxide (layer structure, $LiNi_{0.33}Co_{0.33}Mn_{0.33}O_2$) having an average particle diameter of 10 µm was prepared. In addition, barium titanate ($BaTiO_3$, perovskite structure) was prepared. Next, barium titanate was charged into a ball mill, was subjected to the milling process for 20 minutes at a rotation speed of 1500 rpm, and the crystallinity of barium titanate was changed. In Example 1, the barium titanate was used as the dielectric material. Next, the positive electrode active material and the dielectric material were charged into a mechanochemical apparatus, and were processed for 5 minutes. With this, composite particles in which the dielectric material (BaTiO3) was adhered to the surface of the positive electrode active material were produced. In Example 1, the composite particles were used as the positive electrode material.

COMPARATIVE EXAMPLE 1

In Comparative Example 1, the positive electrode material was produced in a manner similar to that of Example 1 except that barium titanate was not used and only the positive electrode active material was charged into the mechanochemical apparatus. That is, in Comparative Example 1, only the positive electrode active material was used as the positive electrode material.

COMPARATIVE EXAMPLES 2 AND 3

In each of Comparative Examples 2 and 3, the composite particles were produced in a manner similar to that of Example 1 except that the milling process time of barium titanate in the ball mill was changed to 5 minutes in Comparative Example 2 and was changed to 40 minutes in Comparative Example 3, and the crystallinity of barium titanate in each of Comparative Examples 2 and 3 was changed, and the composite particles were used as the positive electrode material.

EXAMPLES 2 TO 5

In each of Examples 2 to 5, the composite particles were produced in a manner similar to that of Example 1 except that the milling process time of barium titanate in the ball mill was changed in a range of 10 to 30 minutes and the crystallinity of barium titanate was changed, and the composite particles were used as the positive electrode material.

X-Ray Diffraction Measurement of Positive Electrode Material

The X-ray diffraction measurement of each of the positive electrode materials (Examples 1 to 5, Comparative Examples 2 and 3) was performed. A measurement apparatus and measurement conditions are as follows. First, peaks derived from the dielectric material were extracted from the obtained X-ray diffraction pattern (vertical axis: diffraction intensity, horizontal axis: diffraction angle 2θ (rad)). Next, a peak having the highest intensity (highest intensity peak) was identified from the extracted peaks. Subsequently, after it was determined that the peak top of the highest intensity peak was in a range satisfying 2θ=31° to 32°, the half width x of the highest intensity peak was calculated. The results of the calculation are shown in the corresponding boxes in Table 1.

measurement apparatus: Ultima IV (manufactured by Rigaku corporation)

target: CuKα ray graphite monochromator slit: divergence slit=1°, light receiving slit=0.1 mm, scattering slit=1° measurement range: 10° to 100° step width: 0.02°

As shown in Table 1, the half width of the dielectric material increased as the milling process time in the ball mill increased. In other words, the crystallinity of the dielectric material was changed, and the disorder of the crystallinity was increased.

Construction of Lithium Secondary Battery

The lithium secondary battery was constructed by using each of the positive electrode materials (Examples 1 to 5, Comparative Examples 1 to 3). Specifically, first, the positive electrode material, acetylene black (AB) serving as the conductive material, and polyvinylidene fluoride (PVdF) serving as the binder were weighed such that a mass ratio satisfied positive electrode active material:AB:PVdF=80:8:2. Next, these materials were mixed in N-methyl-2-pyrrolidone (NMP) by using a planetary mixer such that a solid fraction became 56 percent by mass, and positive electrode slurry was thereby prepared. The positive electrode slurry was applied to a belt-like aluminum foil (positive electrode current collector) along a longitudinal direction by using a die coater, and was dried. Subsequently, the dried positive electrode slurry was pressed together with the aluminum foil. With this, a belt-like positive electrode sheet having the positive electrode active material layer on the positive electrode current collector was produced.

Next, a belt-like negative electrode sheet having the negative electrode active material layer containing graphite (negative electrode active material) on a copper foil (negative electrode current collector) was prepared. Next, a wound electrode body was produced by causing the produced positive electrode sheet and the produced negative electrode sheet to oppose each other via a belt-like separator sheet and winding them in a longitudinal direction. Subsequently, a positive electrode current collector member was welded to the positive electrode sheet, and a negative electrode current collector member was welded to the negative electrode sheet. Next, as the nonaqueous electrolyte solution, a solution obtained by melting $LiPF_6$ serving as the supporting electrolyte at a concentration of 1.0 M in a mixed solvent containing ethylene carbonate (EC), dimethyl carbonate (DMC), and ethyl methyl carbonate (EMC) at a volume ratio of EC:DMC:EMC=1:1:1 was prepared. Subsequently, the produced wound electrode body and the nonaqueous electrolyte solution were accommodated in a battery case and the battery case was sealed, and the lithium secondary battery (each of Examples 1 to 5 and Comparative Examples 1 to 3) was constructed.

Activation Process and Measurement of Initial Capacity

After the produced lithium secondary battery was subjected to constant current (CC) charge at a rate of ⅓ C until voltage became 4.2 V in a temperature environment of 25° C., the lithium secondary battery was subjected to constant voltage (CV) charge until current became 1/50 C. Next, constant current (CC) discharge was performed at a rate of ⅓ C until voltage became 3 V. A CC discharge capacity at this point was used as an initial capacity. Note that "1 C" means a current value which allows charging of a battery capacity (Ah) predicted from the theoretical capacity of the positive electrode active material in one hour.

Evaluation of High Rate Discharge Characteristics

The lithium secondary battery subjected to the activation process was adjusted in a temperature environment of 25° C. such that open circuit voltage became 3.70 V. Next, the CC discharge was performed at a rate of 20 C until inter-terminal voltage became 3.3 V in a temperature environment of −5° C., and the CC discharge capacity at this point was measured. The result of the measurement is shown in Table 1. Note that Table 1 shows values which are normalized by using the discharge capacity of the lithium secondary battery according to Comparative Example 1 as a reference (1.00).

Evaluation of High Rate Cycle Characteristics

The lithium secondary battery subjected to the activation process was put in a constant temperature bath of 60° C., and the battery temperature was stabilized. Subsequently, 200 cycles of high rate charge and discharge were performed in a temperature environment of 60° C. in a voltage range of 3.3 V to 4.2 V. At this point, the charge and discharge were performed at a charge-discharge rate of 10 C according to a constant current method. After 200 cycles of the charge and discharge, the lithium secondary battery was taken out of the constant temperature bath, and the CC discharge capacity was measured by the same method as that used for the measurement of the initial capacity. Subsequently, a capacity maintenance rate was calculated by dividing the CC discharge capacity after 200 cycles by the initial capacity. The result of the calculation is shown in Table 1. Note that Table 1 shows values which are normalized by using the capacity maintenance rate of the lithium secondary battery according to Comparative Example 1 as a reference (1.00).

Evaluation of Internal Short Circuit Resistance

After the lithium secondary battery subjected to the activation process was charged by the CC charge at a rate of ⅓ C until voltage became 4.2 V in a temperature environment of 25° C., the lithium secondary battery was subjected to the CV charge until current became 1/10 C, and was thereby fully charged. Next, a thermocouple was stuck to the outer surface of the lithium secondary battery. Subsequently, an iron nail having a diameter of 3 mm was caused to pierce the vicinity of the center of the fully charged lithium secondary battery at a speed of 10 mm/sec in a temperature environment of 25° C. The maximum temperature of the lithium secondary battery at this point was measured. The result of the measurement is shown in Table 1. Note that, in Table 1, "O" indicates the case where the maximum temperature is less than 200° C., and "X" indicates the case where the maximum temperature is not less than 200° C.

TABLE 1

| | Dielectric Material | | Evaluation Result | | |
| --- | --- | --- | --- | --- | --- |
| | Type | Half Width of Highest Intensity Peak | High Rate Discharge Capacity | High Rate Cycle Capacity Maintenance Rate | Nail Piercing Test |
| Comparative Example 1 | — | — | 1.00 | 1.00 | X |
| Comparative Example 2 | $BaTiO_3$ | 0.21 | 1.11 | 1.20 | X |
| Example 1 | | 0.22 | 3.01 | 2.92 | O |
| Example 2 | | 0.24 | 3.05 | 2.94 | O |
| Example 3 | | 0.28 | 3.11 | 3.00 | O |
| Example 4 | | 0.32 | 3.08 | 2.93 | O |
| Example 5 | | 0.33 | 3.09 | 2.91 | O |
| Comparative Example 3 | | 0.34 | 1.15 | 1.19 | X |

Figure 2:
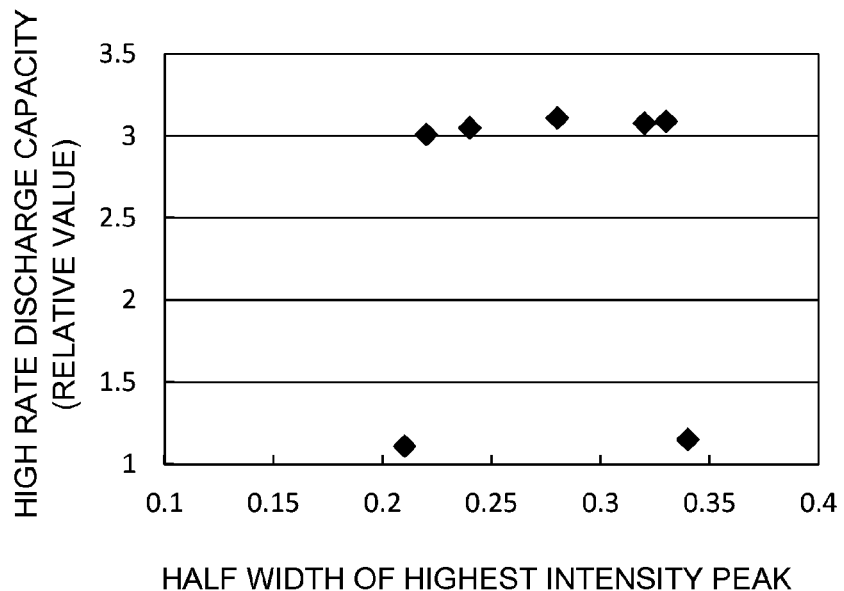
FIG. 2 is a graph showing a relationship between a half width of a highest intensity peak and a high rate discharge capacity.
Figure 3:
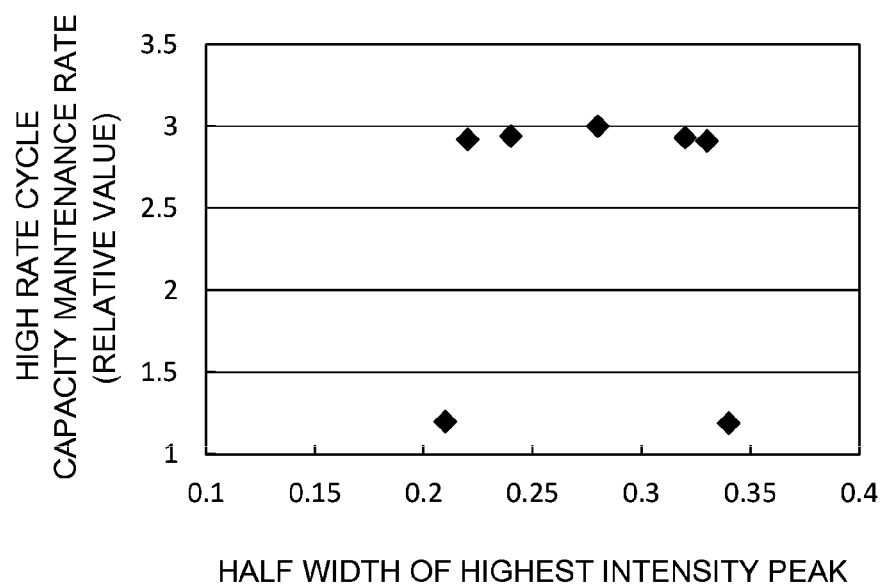
FIG. 3 is a graph showing a relationship between the half width of the highest intensity peak and a high rate cycle capacity maintenance rate.

FIG. 2 is a graph showing a relationship between the half width of the highest intensity peak and the high rate discharge capacity. FIG. 3 is a graph showing a relationship between the half width of the highest intensity peak and the high rate cycle capacity maintenance rate. As shown in Table 1 and FIGS. 2 and 3, in each of Examples 1 to 5 in which the dielectric material having the half width of the highest intensity peak of 0.22 to 0.33 was combined with the positive electrode active material, high rate characteristics were relatively excellent as compared with Comparative Example 1 in which the positive electrode active material was used as the positive electrode material without being altered, and each of Comparative Examples 2 and 3 in which the dielectric material having the half width of the highest intensity peak which didn't satisfy the above range was combined with the positive electrode active material. Specifically, the high rate discharge capacity and the capacity maintenance rate after the high rate cycle were significantly high. In addition, in each of Examples 1 to 5, an increase in battery temperature at the time of a nail piercing test was suppressed. In other words, the battery in each of Examples 1 to 5 was excellent not only in high rate characteristics but also in internal short circuit resistance.

Although not particularly limited, reasons for excellent high rate characteristics of the battery in each of Examples 1 to 5 obtained as a result of studies by the present inventors presumably, the flow of current was quickly interrupted, and an increase in battery temperature was suppressed.

TEST EXAMPLE II

Study on Type of Dielectric Material

EXAMPLES 6 TO 8

Each of Examples 6 to 8 is identical to Example 2 of Test Example I except that the type of the dielectric material is changed to those shown in Table 2. Specifically, instead of barium titanate, strontium titanate (Example 6), barium lanthanum titanate (Example 7), and lead titanate (Example 8) were used as the dielectric materials. The lithium secondary battery was constructed in a manner similar to that of Test Example I, and various evaluations were performed. The results of the evaluations are shown in Table 2. Note that each of the discharge capacity and the capacity maintenance rate in Table 2 indicates values which are normalized by using the result of Comparative Example 1 as a reference (1.00).

TABLE 2

| | Dielectric Material | | Evaluation Result | | |
|---|---|---|---|---|---|
| | Type | Half Width of Highest Intensity Peak | High Rate Discharge Capacity | High Rate Cycle Capacity Maintenance Rate | Nail Piercing Test |
| Comparative Example 1 | — | — | 1.00 | 1.00 | X |
| Example 2 | $BaTiO_3$ | 0.24 | 3.05 | 2.94 | ○ |
| Example 6 | $SrTiO_3$ | 0.24 | 3.01 | 3.00 | ○ |
| Example 7 | $Ba_{0.5}La_{0.5}TiO_3$ | 0.24 | 2.97 | 2.9 | ○ |
| Example 8 | $PbTiO_3$ | 0.24 | 2.02 | 1.98 | ○ | are as follows. That is, in the dielectric material which has the highest intensity peak in a range satisfying $2\theta=31°$ to $32°$ and has the half width of the highest intensity peak of 0.22 to 0.33, disorder of crystallinity in a predetermined range is present. A distortion is caused in the crystal lattice by the disorder of the crystallinity. A local increase in dielectric constant is spontaneously caused on the surface of the positive electrode material during charge and discharge so that the distortion is stabilized. With this, a force for attracting the lithium ion in the nonaqueous electrolyte solution is increased, and the affinity between the positive electrode material and the nonaqueous electrolyte solution is improved. As a result, presumably, the reaction activity of the positive electrode active material at the time of charge and discharge was enhanced, and the resistance of the positive electrode was reduced. In addition, unevenness in charge-discharge reaction becomes less likely to occur in the positive electrode, and the side reaction is reduced. As a result, presumably, high rate cycle characteristics were improved.

In addition, although not particularly limited, a reason for excellent internal short circuit resistance of the battery in each of Examples 1 to 5 obtained as a result of studies by the present inventors is as follows. That is, the dielectric material has the peculiar temperature dependence. In other words, while the electrical resistance is suppressed to a low level during the normal use of the battery, when the internal temperature of the battery is increased, resistance is sharply increased, e.g., at a bonding interface between the positive electrode active material and the dielectric. As a result, As shown in Table 2, in each of Examples 6 to 8 in which a Ti-containing compound was used, similarly to Example 2, excellent high rate characteristics were implemented. Among them, in each of Examples 2, 6, and 7 in which a compound which contained at least one of the alkaline earth metal element and the rare earth element was used, high rate characteristics were relatively high as compared with Example 8 in which a compound which didn't contain the alkaline earth metal element or the rare earth element was used. From this, it was found that the effect of the technique disclosed herein was exerted at a higher level by using the compound which contained one or two or more of the alkaline earth metal elements and the rare earth elements (e.g., at least one of Sr, Ba, and La).

TEST EXAMPLE III

Study on Molar Ratio c of Dielectric Material

EXAMPLES 9 TO 14

Each of Examples 9 to 14 is identical to Example 2 of Test Example I except that a molar ratio c (A element/B element) between the A element and the B element of the dielectric material ($BaTiO_3$) having the $ABO_{3-\delta}$ crystal structure is changed in a range of 0.910 to 0.995, as shown in Table 3. Specifically, a compounding ratio between the A element and the B element was changed at the time of the production of the dielectric material, and the obtained dielectric material was used. Subsequently, the lithium secondary battery was constructed in a manner similar to that of Test Example I, and various evaluations were performed. The results of the evaluations are shown in Table 3. Note that the discharge capacity in Table 3 indicates values which are normalized by using the result of Comparative Example 1 as a reference (1.00).

TABLE 3

| | Dielectric Material | | | Evaluation Result | | |
|---|---|---|---|---|---|---|
| | Type | c (A/B) | Half Width of Highest Intensity Peak | High Rate Discharge Capacity | High Rate Cycle Capacity Maintenance Rate | Nail Piercing Test |
| Example 9 | BaTiO$_3$ | 0.910 | 0.24 | 2.98 | 2.91 | ○ |
| Example 10 | | 0.920 | | 4.01 | 4.04 | ○ |
| Example 11 | | 0.940 | | 4.09 | 4.07 | ○ |
| Example 12 | | 0.960 | | 4.00 | 3.99 | ○ |
| Example 13 | | 0.993 | | 3.98 | 3.89 | ○ |
| Example 14 | | 0.995 | | 2.96 | 2.89 | ○ |

As shown in Table 3, in each of Examples 10 to 13 in which the molar ratio c of the dielectric material having the ABO$_{3-\delta}$ crystal structure was 0.92 to 0.993, high rate characteristics were relatively excellent as compared with each of Examples 9 and 14 in which the molar ratio c of the dielectric material didn't satisfy the above range. From this, it was found that the effect of the technique disclosed herein was exerted at a higher level by adjusting the molar ratio c of the dielectric material to 0.920 to 0.993 (preferably 0.920 to 0.960).

TEST EXAMPLE IV

Study on Oxygen Deficiency Amount δ of Dielectric Material

EXAMPLES 15 TO 19

Each of Examples 15 to 19 is identical to Example 11 of Test Example III except that the oxygen deficiency amount δ of the dielectric material (BaTiO$_3$) having the ABO$_{3-\delta}$ crystal structure is changed in a range of 0.05 to 0.4, as shown in Table 4. Specifically, after the dielectric material was subjected to the milling process in the ball mill, the dielectric material was subjected to the heat treatment at a temperature of 600° C. to 800° C. and was then used. Subsequently, the lithium secondary battery was constructed in a manner similar to that of Test Example I, and various evaluations were performed. The results of the evaluations are shown in Table 4. Note that each of the discharge capacity and the capacity maintenance rate in Table 4 indicates values which are normalized by using the result of Comparative Example 1 as a reference (1.00).

As shown in Table 4, in each of Examples 16 to 18 in which the oxygen deficiency amount δ of the dielectric material having the ABO3 crystal structure was 0.1 to 0.3, high rate characteristics were relatively excellent as compared with each of Examples 15 and 19 in which the oxygen deficiency amount δ didn't satisfy the above range. From this, it was found that the effect of the technique disclosed herein was exerted at a higher level by adjusting the oxygen deficiency amount δ of the dielectric material to 0.1 to 0.3 (e.g., 0.2±0.05).

TEST EXAMPLE V

Study on Content of Dielectric Material

EXAMPLES 20 TO 26

Each of Examples 20 to 26 is identical to Example 7 of Test Example IV except that the content (mol %) of the dielectric material relative to 100 mol % of the positive electrode active material is changed in a manner shown in Table 5. Specifically, the positive electrode active material and the dielectric material were mixed such that a mixing ratio (molar ratio) between the positive electrode active material and the dielectric material satisfied a range of positive electrode active material:dielectric material=100 mol %:0.005 to 11.000 mol %, and the obtained composite particles were used as the positive electrode material. Subsequently, the lithium secondary battery was constructed in a manner similar to that of Test Example I, and various evaluations were performed. The results of the evaluations are shown in Table 5. Note that each of the discharge capacity and the capacity maintenance rate in Table 5 indicates values which are normalized by using the result of Comparative Example 1 as a reference (1.00).

TABLE 4

| | Dielectric Material | | | | Evaluation Result | | |
|---|---|---|---|---|---|---|---|
| | | | | | | High Rate | |
| | Type | c (A/B) | δ | Half Width of Highest Intensity Peak | High Rate Discharge Capacity | Cycle Capacity Maintenance Rate | Nail Piercing Test |
| Example 15 | BaTiO$_3$ | 0.940 | 0.05 | 0.24 | 4.00 | 3.99 | ○ |
| Example 16 | | | 0.10 | | 4.71 | 4.72 | ○ |
| Example 17 | | | 0.20 | | 4.85 | 4.86 | ○ |
| Example 18 | | | 0.30 | | 4.73 | 4.75 | ○ |
| Example 19 | | | 0.40 | | 3.98 | 4.05 | ○ |

TABLE 5

| | Dielectric Material | | | | Evaluation Result | | |
|---|---|---|---|---|---|---|---|
| | Type | c (A/B) | δ | Half Width of Highest Intensity Peak | Content (mol %) | High Rate Discharge Capacity | High Rate Cycle Capacity Maintenance Rate | Nail Piercing Test |
| Example 20 | BaTiO$_3$ | 0.940 | 0.20 | 0.24 | 0.005 | 4.85 | 4.86 | ○ |
| Example 21 | | | | | 0.010 | 5.55 | 5.49 | ○ |
| Example 22 | | | | | 1.000 | 5.73 | 5.72 | ○ |
| Example 23 | | | | | 3.000 | 5.66 | 5.68 | ○ |
| Example 24 | | | | | 8.000 | 5.59 | 5.59 | ○ |
| Example 25 | | | | | 10.000 | 5.58 | 5.6 | ○ |
| Example 26 | | | | | 11.000 | 4.83 | 4.81 | ○ |

As shown in Table 5, in each of Examples 21 to 25 in which the content of the dielectric material was 0.01 to 10 mol %, high rate characteristics were relatively excellent as compared with each of Examples 20 and 26 in which the content didn't satisfy the above range. From this, it was found that the effect of the technique disclosed herein was exerted at a higher level by adjusting the content of the dielectric material to 0.01 to 10 mol % (preferably 0.01 to 10 mol %, more preferably 1 to 3 mol %).

TEST EXAMPLE VI

Study on Type of Positive Electrode Active Material

COMPARATIVE EXAMPLES 4 TO 8

In Comparative Examples 4 to 8, similarly to Comparative Example 1 of Test Example I, positive electrode active materials of types shown in Table 6 were used as the positive electrode materials without being altered. Specifically, instead of a lithium/nickel/cobalt/manganese composite oxide, a lithium/cobalt composite oxide (Comparative Example 4), a lithium/manganese composite oxide (Comparative Example 5), a lithium/nickel composite oxide (Comparative Example 6), a lithium/nickel/manganese composite oxide (Comparative Example 7), and a lithium/nickel/cobalt/aluminum composite oxide (Comparative Example 8) were used as the positive electrode active materials.

EXAMPLES 27 TO 31

Each of Examples 27 to 31 is identical to Example 2 of Test Example I except that the type of the positive electrode active material is changed to that shown in Table 6. Note that, in each of Examples 27 to 31, the half width x of the highest intensity peak of the dielectric material is 0.24 rad.

Subsequently, the lithium secondary battery was constructed in a manner similar to that of Test Example I, and various evaluations were performed. The results of the evaluations are shown in Table 6. Note that each of the discharge capacity and the capacity maintenance rate in Table 6 indicates values which are normalized by using the result in the case where only the positive electrode active material is used as a reference (1.00).

TABLE 6

| | Positive Electrode Material | | Evaluation Result | | |
|---|---|---|---|---|---|
| | Positive Electrode Active Material | Dielectric Material | High Rate Discharge Capacity | High Rate Cycle Capacity Maintenance Rate | Nail Piercing Test |
| Comparative Example 1 | LiNi$_{0.33}$Co$_{0.33}$Mn$_{0.33}$O$_2$ (Layer Structure) | — | 1.00 | 1.00 | X |
| Example 2 | | BaTiO$_3$ | 3.05 | 2.94 | ○ |
| Comparative Example 4 | LiCoO$_2$ (Layer Structure) | — | 1.00 | 1.00 | X |
| Example 27 | | BaTiO$_3$ | 2.92 | 2.83 | ○ |
| Comparative Example 5 | LiMn$_2$O$_4$ (Spinel Structure) | — | 1.00 | 1.00 | X |
| Example 28 | | BaTiO$_3$ | 2.95 | 2.86 | ○ |
| Comparative Example 6 | LiNiO$_2$ (Layer Structure) | — | 1.00 | 1.00 | X |
| Example 29 | | BaTiO$_3$ | 2.88 | 2.81 | ○ |
| Comparative Example 7 | LiNi$_{0.5}$Mn$_{1.5}$O$_4$ (Spinel Structure) | — | 1.00 | 1.00 | X |
| Example 30 | | BaTiO$_3$ | 2.96 | 2.79 | ○ |

TABLE 6-continued

|  | Positive Electrode Material | | Evaluation Result | | |
|---|---|---|---|---|---|
|  | Positive Electrode Active Material | Dielectric Material | High Rate Discharge Capacity | High Rate Cycle Capacity Maintenance Rate | Nail Piercing Test |
| Comparative Example 8 | $LiNi_{0.8}Co_{0.15}Al_{0.05}O_2$ (Layer Structure) | — | 1.00 | 1.00 | X |
| Example 31 |  | $BaTiO_3$ | 2.95 | 2.85 | ○ |

As shown in Table 6, even when any of the positive electrode active materials was used, the effect of the technique disclosed herein was appropriately exerted. From this, it was found that it was possible to apply the technique disclosed herein to various types of positive electrode active materials having various crystal structures. In addition, although a mechanism was not determined, high rate characteristics were most excellent in Example 2 in which the lithium/nickel/cobalt/manganese composite oxide was used as the positive electrode active material. From this, it was found that the effect of the technique disclosed herein was exerted at a higher level by using the lithium/nickel/cobalt/manganese composite oxide as the positive electrode active material.

While the technique disclosed herein has been described in detail, the above embodiment and examples are only illustrative, and the invention disclosed herein encompasses various modifications and changes to the specific examples described above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A positive electrode material comprising:
    a positive electrode active material; and
    a dielectric material disposed on a surface of the positive electrode active material and having a perovskite crystal structure,
    wherein, in an X-ray diffraction pattern which is obtained by X-ray diffraction measurement using a CuKα ray and in which a vertical axis indicates a diffraction intensity, a horizontal axis indicates a diffraction angle 2θ, and a unit is rad, a highest intensity peak which is a peak derived from the dielectric material and has a highest intensity is in a range satisfying 2θ=31° to 32°, and a half width x of the highest intensity peak satisfies the following expression: 0.22≤x≤0.33, and
    wherein the dielectric material is $BaTiO_3$ with a $BaTiO_{3-\delta}$ crystal structure, wherein δ is a positive number satisfying 0.1 δ 0.3.

2. The positive electrode material according to claim 1, wherein a molar ratio of Ba to Ti is 0.920 or more and 0.993 or less.

3. The positive electrode material according to claim 1, wherein, when a content of the positive electrode active material is 100 mol %, a content of the dielectric material is 0.01 mol % or more and 10 mol % or less.

4. A secondary battery comprising the positive electrode material according to claim 1 in a positive electrode.

5. The positive electrode material according to claim 1, wherein an average particle diameter of the dielectric material is 1/20 to 1/10 of an average particle diameter of the positive electrode active material.

* * * * *